US012245226B2

(12) United States Patent
Cao (10) Patent No.: US 12,245,226 B2
(45) Date of Patent: Mar. 4, 2025

(54) TRIGGER FRAME ARRANGED TO SOLICIT TRANSMISSION OF DISTRIBUTED RESOURCE UNITS, AND METHODS FOR GENERATING THE TRIGGER FRAME

(71) Applicant: NXP USA, Inc., Austin, TX (US)

(72) Inventor: Rui Cao, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 337 days.

(21) Appl. No.: 17/806,859

(22) Filed: Jun. 14, 2022

(65) Prior Publication Data

US 2022/0408462 A1 Dec. 22, 2022

Related U.S. Application Data

(60) Provisional application No. 63/263,517, filed on Nov. 4, 2021, provisional application No. 63/211,387, filed on Jun. 16, 2021.

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC . H04W 72/1268; H04W 72/00; H04W 72/23; H04W 74/006; H04W 74/00; H04W 74/06; H04L 5/00; H04L 5/042; H04L 5/0094
See application file for complete search history.

(56) References Cited

U.S. PATENT DOCUMENTS

| 11,044,057 | B2 | 6/2021 | Asterjadhi et al. | |
|---|---|---|---|---|
| 2021/0143966 | A1* | 5/2021 | Yu | H04L 5/0053 |
| 2021/0227529 | A1 | 7/2021 | Chu et al. | |
| 2021/0391961 | A1 | 12/2021 | Cao et al. | |
| 2021/0392661 | A1 | 12/2021 | Cao et al. | |

(Continued)

FOREIGN PATENT DOCUMENTS

| EP | 4185047 A1 * | 5/2023 | ........ H04W 72/0453 |
|---|---|---|---|
| WO | WO-2022022249 A1 * | 2/2022 | ........ H04W 72/0453 |

OTHER PUBLICATIONS

U.S. Appl. No. 17/752,763 "Device, System, and Method for Power Spectrum Density (PSD) Limited Transmissions", filed May 24, 2022.

(Continued)

*Primary Examiner* — Mohamed A Kamara (57) ABSTRACT

Wireless communications comprises generating a trigger frame which has a first set of bits which directly indicates a resource unit (RU) arranged as a distributed RU is solicited to be transmitted in an uplink direction in a first frequency block and a second set of bits which directly indicates for one or more second frequency subblocks a spreading bandwidth of tones of the distributed RU or whether a second frequency subblock is a punctured subchannel. An access point (AP) transmits the trigger frame in a downlink direction to a non-AP station. The non-AP station generates and transmits in the uplink direction a Physical Layer Protocol Data Unit (PPDU) to the AP station with data modulated on the tones of the distributed RU based on the first set of bits and the second set of bits of the trigger frame.

19 Claims, 8 Drawing Sheets

(56) References Cited

U.S. PATENT DOCUMENTS

| | | | |
|---|---|---|---|
| 2021/0400670 A1 | 12/2021 | Hu et al. | |
| 2023/0117291 A1* | 4/2023 | Iwai | H04L 1/0004 370/329 |
| 2023/0130569 A1* | 4/2023 | Kim | H04L 5/0092 370/329 |
| 2023/0403126 A1* | 12/2023 | Gong | H04L 27/2613 |

OTHER PUBLICATIONS

IEEE P802.11be_D1.2 "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)" 2021, 735 pages.

IEEE 802.11ax /D6.0, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," 2019, 780 pages.

\* cited by examiner

TRIGGER FRAME ARRANGED TO SOLICIT TRANSMISSION OF DISTRIBUTED RESOURCE UNITS, AND METHODS FOR GENERATING THE TRIGGER FRAME

RELATED APPLICATION

This application claims a benefit of priority to U.S. Provisional Application No. 63/263,517, entitled "Signaling of Distributed RU" filed Nov. 4, 2021 and U.S. Provisional Application No. 63/211,387, entitled "Distributed RU signaling for UL TB transmission" filed Jun. 16, 2021, the contents each of which are incorporated herein by reference in its entirety.

FIELD OF USE

This disclosure generally relates to wireless communication, and more particularly to a trigger frame arranged to solicit transmission of distributed resource units.

BACKGROUND

In wireless communications, wireless devices, e.g., Access Point (AP) multi-link devices (MLDs) or non-AP MLDs, e.g., station (STA) MLD, execute various multi-link operations, such as transmission and reception of Physical Layer Protocol Data Units (PPDUs) on multiple links to exchange data in accordance with a communication protocol such as IEEE 802.1 the Extremely High Throughput (EHT). The PPDU includes a preamble portion and a data portion.

The data portion of the PPDU includes one or more resource units (RUs) which has subcarriers (tones) to transmit data of the data portion. The RU with contiguous tones is referred to as a regular RU. Federal Communications Commission (FCC) regulations have recently established a power spectrum density (PSD) limit for wireless devices (e.g., APs or non-AP STAs) transmitting PPDUs in a 6 GHz frequency band associated with a low power indoor (LPI) transmission mode. For example, when a PPDU is transmitted in a frequency band of 6 GHz, the PSD may be limited to 5 dBm per 1 MHz for an AP and −1 dBm per 1 MHz for a non-AP STA. To stay within the PSD while transmitting at a peak power, the contiguous tones of the regular RU which are originally arranged within a narrow band is distributed over a larger band where the tones of the RU are no longer contiguous. The RU with tones which are no longer contiguous is referred to as a distributed RU. The distributed RU increases bandwidth of the data portion of the PPDU to allow for greater transmission power and extended transmission range in accordance with the PSD limit.

BRIEF DESCRIPTION OF THE DRAWINGS

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows associated with a trigger frame arranged for soliciting an uplink transmission of distributed resource units.

Overview

Embodiments disclosed herein are directed to soliciting a distributed resource unit (dRU) in a transmission. The solicitation is via a trigger frame from an access point (AP) station to a non-AP station. The trigger frame indicates as an RU type field whether a regular RU or a distributed RU is solicited to be transmitted in a frequency subblock such as an 80 MHz frequency subblock. Further, the trigger frame may have a spreading information field which indicates a spreading bandwidth that the distributed RU is to be spread over or a puncturing of subchannels of a channel. The non-AP that receives the trigger frame parses the RU type field and spreading information field in the trigger frame to generate and transmit in an uplink transmission a Physical Layer Protocol Data Units (PPDUs) with data modulated on tones of the distributed RU in response to the trigger frame. Well known instructions, protocols, structures, and techniques have not been shown in detail in order not to obfuscate the description.

Example Systems

Figure 1:
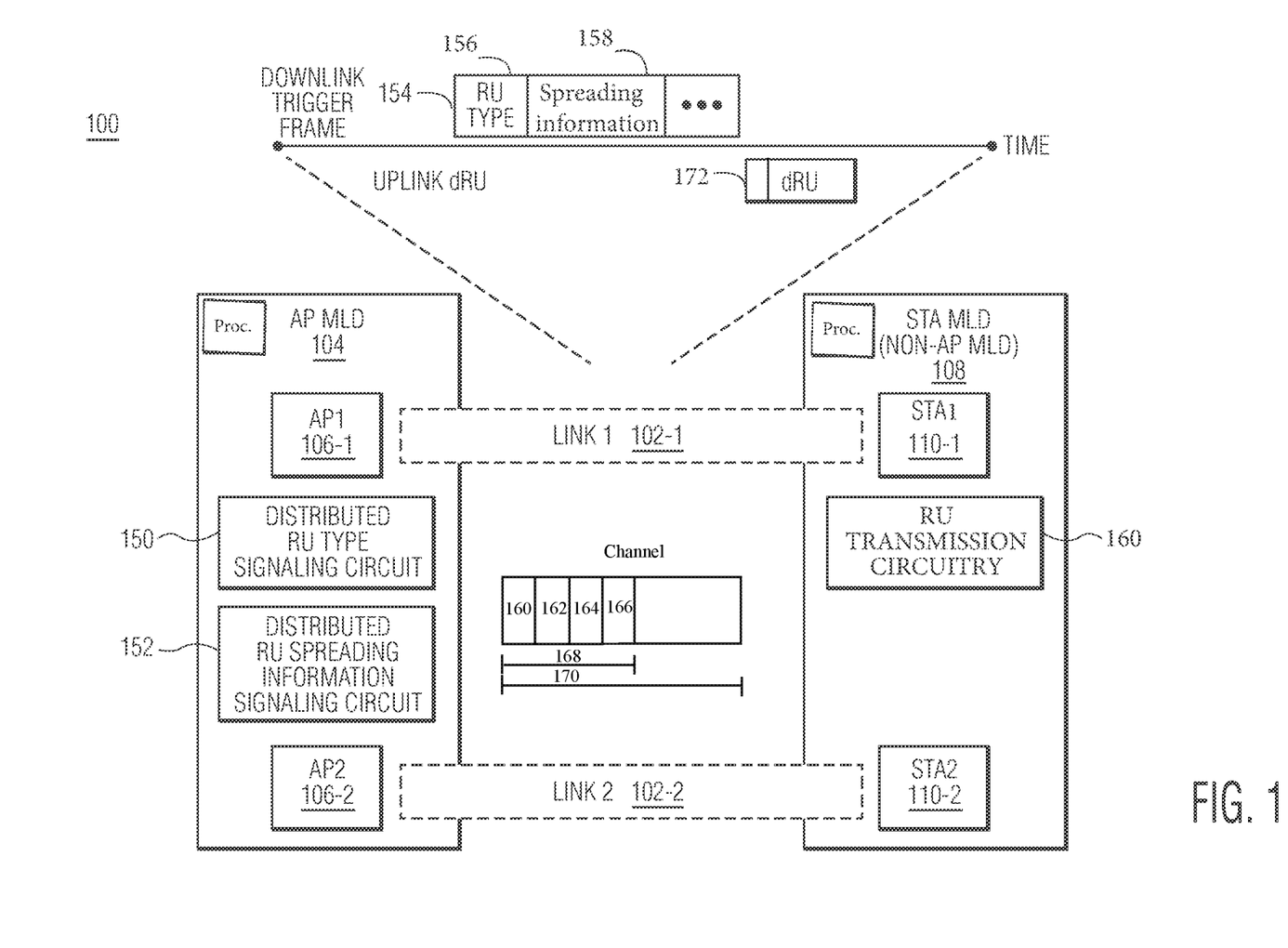
FIG. 1 is an example block diagram of a multi-link communications system that is used for wireless (e.g., WiFi) communications in accordance with an embodiment.

FIG. 1 is an example block diagram of a multi-link communications system 100 that is used for wireless (e.g., WiFi) communications in accordance with an embodiment. In the embodiment depicted in FIG. 1, the multi-link communications system 100 includes one AP multi-link device, which is implemented as AP MLD 104, and one non-AP MLD 108 also referred to as a station (STA) MLD. The multi-link communications system 100 may be used in various applications, such as industrial applications, medical applications, computer applications, and/or consumer or enterprise applications. In some embodiments, the multi-link communications system 100 is a wireless communications system, such as a wireless communications system compatible with an IEEE 802.11 protocol. For example, the multi-link communications system 100 may be a wireless communications system compatible with the IEEE 802.11be protocol and subsequent standards. Although the depicted multi-link communications system 100 is shown in FIG. 1 with certain components and described with certain functionality herein, other embodiments of the multi-link communications system 100 may include fewer or more components to implement the same, less, or more functionality. For example, in some embodiments, the multi-link communications system 100 includes multiple AP MLDs with one STA MLD, or multiple AP MLDs with more than one STA MLD. In another example, although the multi-link communications system 100 is shown in FIG. 1 as being connected in a certain topology, the network topology of the multi-link communications system 100 is not limited to the topology shown in FIG. 1. Although the multi-link communications system 100 described with reference to FIG. 1 involves multi-link communications with MLDs, the techniques described herein are also applicable to single-link communications.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., block acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof controlled by a processor (shown as "proc." in FIG. 1), such as a microcontroller, a host processor, a host, a digital signal processor (DSP), a central processing unit (CPU), or integrated circuit (IC) to perform the disclosed functions. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be integrated in a corresponding transceiver.

In the embodiment depicted in FIG. 1, STA MLD 108 includes two radios which are implemented as non-AP STAs such as STA1 110-1 and STA2 110-2. The STAs 110-1 and 110-2 may be implemented in hardware (e.g., circuits), software, firmware, or a combination thereof controlled by a processor (shortened to "proc."), such as a microcontroller, a host processor, a host, a DSP, a CPU, or IC to perform the disclosed functions. In some embodiments, the STA MLD 108 may be implemented in a laptop, a desktop personal computer (PC), a mobile phone, or other communications device that supports at least one WLAN communications protocol. In some embodiments, the STA MLD 108 is a communications device compatible with at least one IEEE 802.11 protocol (e.g., the IEEE 802.11be protocol) which implements a common MAC data service interface while the non-AP STAs 110-1 and 110-2 implement a lower layer MAC data service interface. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be integrated in a corresponding transceiver.

In the embodiment depicted in FIG. 1, one MLD communicates with another MLD via two communication links, e.g., link 1 102-1 and link 2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may be established over a channel of a wireless spectrum such as a 5 GHz or 6 GHz wireless spectrum. The channel may include operating subchannels and the AP MLD 104 (e.g., AP1 106-1 or AP2 106-2) or STA MLD 108 may use multiple subchannels to transmit frames (e.g., Physical Layer Protocol Data Units (PPDUs), beacons, management frames, etc.) between a first wireless device (e.g., an AP) and a second wireless device (e.g., a non-AP STA). A frequency subblock may define a bandwidth of the channel or subchannel. In an example, the channel may have frequency subblock 168 which comprises one or more smaller frequency subblocks 160-166 and one or more frequency subblocks such as frequency subblock 168 may define a signal bandwidth 170 in which a PPDU is transmitted. Examples of the signal bandwidth 170 may include 80 MHz, 160 MHz, 320 MHz, or more than 320 MHz bandwidth. Further, the frequency subblock 168 may be a 80 MHz frequency subblock and the frequency subblocks 160-166 may each be 20 MHz frequency subblocks. Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via one link or more than two communication links.

Communication between the AP MLD 104 and the STA MLD 108 may be further based on orthogonal frequency division multiple access (OFDMA) where a data portion of the PPDU which is transmitted has multiple resource units (RUs) which comprises one or more frequency subcarriers ("tones") in one or more frequency blocks of the signal bandwidth on which data is modulated. In some embodiments, a PPDU frame format may be one of a group consisting of a high efficiency (HE) multi-user (MU) PPDU frame format and an extremely high throughput (EHT) MU PPDU frame format among other formats. In some implementations, a smallest RU may have a size defined by a number of tones, such as 26 tones consisting of 24 data tones and 2 pilot tones. Consequently, in a 20 MHz frequency subblock, up to 9 RUs (such as 2 MHz, 26-tone RUs) may be allocated. RUs may include more tones such as 52 tones, 106 tones, 242 tones, 484 tones and 996 tones where an RU of 996 tones spans a 80 MHz frequency block.

For downlink OFDMA transmissions, a trigger frame may be transmitted from an AP to a non-AP STAs to solicit transmission of an RU by the non-AP STA to the AP. The trigger frame may also be a PPDU with a plurality of fields to address one or more non-AP STA through respective association identifiers (AIDs) and may assign each AID (and thus each non-AP STA) one or more RUs that can be used to send a PPDU to an AP. In an example, an AP MLD may transmit and receive PPDUs with a non-AP MLD on one or more links to exchange data in accordance with a communication protocol such as IEEE 802.11be Extremely High Throughput (an). Federal Communications Commission (FCC) regulations have recently established a power spectrum density (PSD) limit for wireless devices (e.g., APs or non-AP STAs) transmitting PPDUs associated with a low power indoor (LPI) transmission mode. For example, when a PPDU is transmitted in a frequency band of 6 GHz, the PSD may be limited to 5 dBm per 1 MHz for an AP and −1 dBm per 1 MHz for a non-AP STA. The tones of the RU may be typically arranged contiguously such that the RU with contiguous tones is referred to as a regular RU (rRU). To stay within the PSD while transmitting at a peak power, the tones of the RU may be distributed over a larger band to form a distributed RU (dRU) where the tones of the RU are no longer contiguous and spread over a larger bandwidth than the contiguous tones. The distributed RU increases bandwidth of the data portion of the PPDU to allow for greater transmission power and extended transmission range in accordance with the PSD limit.

Embodiments disclosed herein are directed to soliciting a distributed resource unit (dRU) in a transmission from an access point (AP) station to a non-AP station. The solicitation is via a trigger frame 154. In an example, trigger frame 154 may be transmitted from the AP to the non-AP STA in a downlink transmission over a link and a distributed RU may be transmitted from the non-AP STA to the AP in an uplink transmission over the link in response to the trigger frame 154. The trigger frame 154 may be a PPDU which indicates as an RU type field 156 whether a regular RU or a distributed RU is solicited to be transmitted in a frequency subblock such as an 80 MHz frequency subblock. Further, the trigger frame 154 may have a spreading information field 158 which indicates as spreading information a spreading bandwidth that the distributed RU is to be spread over or subchannels which are punctured in the channel as described in further detail below. The AP MLD 104 may have a distributed RU type signaling circuit 150 and distributed RU spreading information signaling circuit 152 to indicate this information in one or more of fields of the trigger frame including a Common Information field, a Special User Information field, and a User Information field of the trigger frame as described in further detail below. The non-AP MLD 108 may have RU transmission circuitry 160 to then parse the RU type field 156 and the spreading information field 158 in the trigger frame 154 to generate and transmit in an uplink transmission a PPDU 172 with data modulated on tones of the distributed RU in response to the trigger frame 154.

Figure 2:
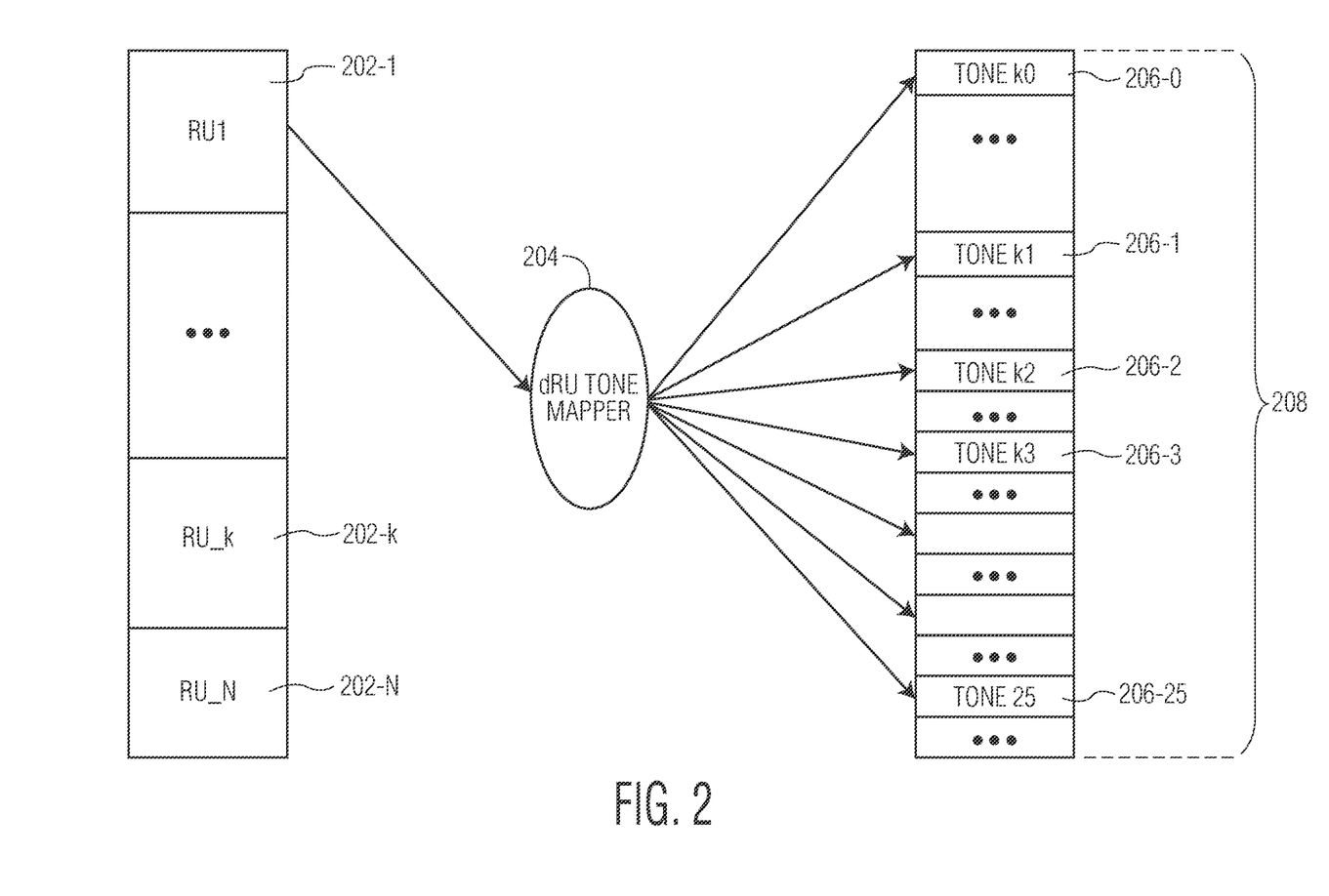
FIG. 2 illustrates a process for spreading tones of a resource unit (RU) to form a distributed RU in accordance with an embodiment.

FIG. 2 illustrates a process for spreading tones of the RU to form the distributed RU in accordance with an embodiment. In an embodiment, the tones of the RU1 202-1 and optionally RU_k 202-k and/or RU_N 202-N, where "k" is an integer greater than 1 and "N" is an integer greater than k) may transmitted where the tones are spread non-contiguously (e.g., Tone k0 206-0, Tone k1 206-1, Tone k2 206-2, Tone k3 206-3, and/or Tone k25 206-25) within one or more frequency blocks to form the distributed RU 208. The distributed RU (dRU) tone mapper 204 may receive the RU 202 comprising tones and spread the tones of the RU 202 to form the distributed RU 208 in accordance with a bandwidth of the spreading. The tones may be spread over one 20 MHz frequency subblocks for a spreading bandwidth of 20 MHz, two 20 MHz frequency subblocks for a spreading bandwidth of 40 MHz, or four 20 MHz frequency subblocks for a bandwidth of 80 MHz of the channel in an example. In an example, a distance between two subcarriers (e.g., Tone k0 206-0 and Tone k1 206-1) included in the distributed RU 208 may be thirteen subcarriers (1 MHz) to maximize transmission power. Furthermore, the technique illustrated by FIG. 2 may also be applied to PPDUs transmitted in up-link (UL) transmissions and down-link (DL) transmissions.

In an example, the trigger frame 154 may be transmitted by an AP to a non-AP STA to solicit an regular RU or distributed RU to be transmitted from the non-AP STA to the AP frame. The trigger frame 154 may be configured by the distributed RU type signaling circuit 150 with various fields defined by 802.11be or next generation 802.11 standards which are further arranged in accordance with embodiments to indicate whether the RU that is triggered is the distributed RU.

Figure 3:
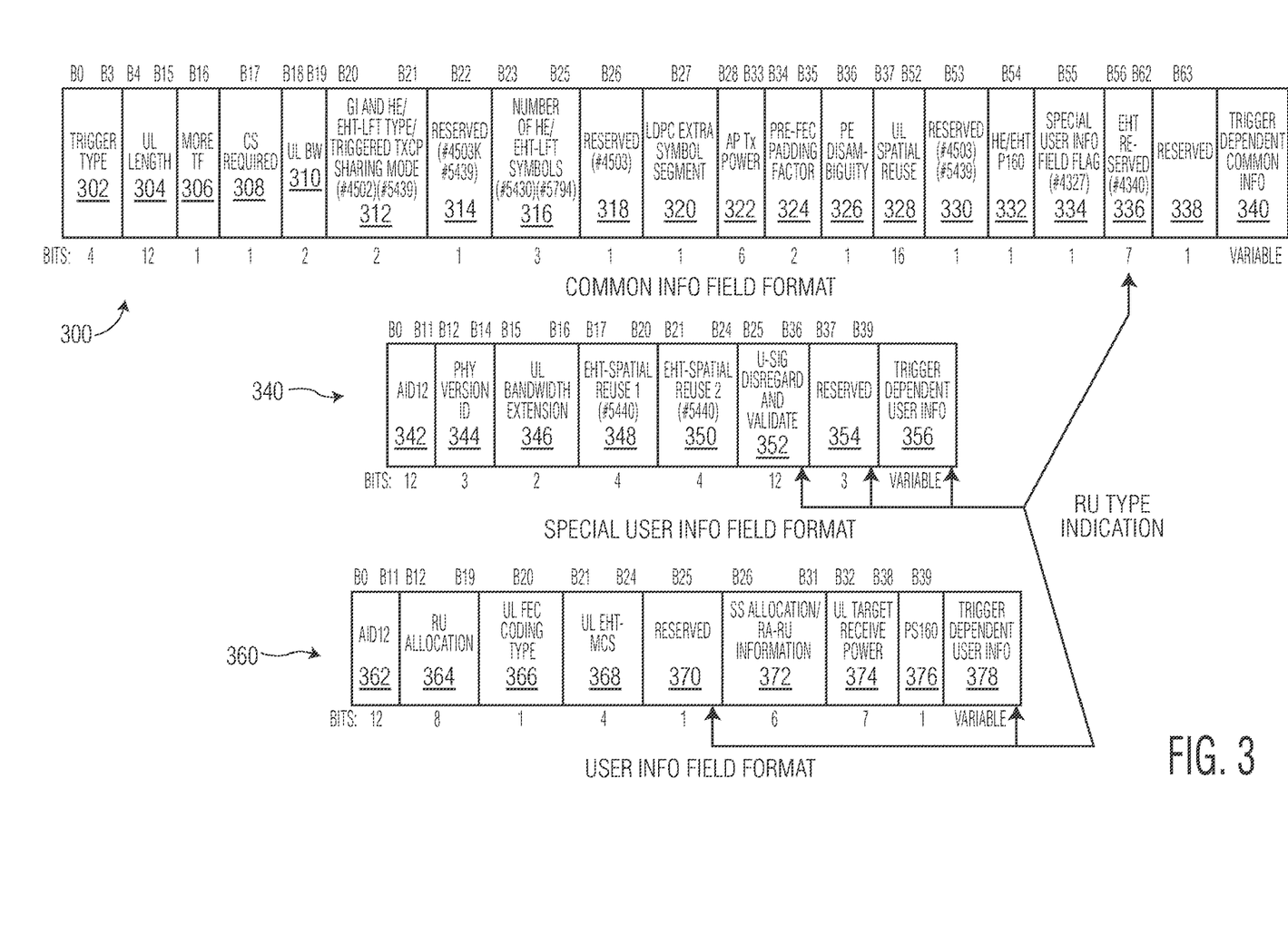
FIG. 3 depicts an example format of a Common Information field, Special User Information field, and User Information field of a trigger frame to signal whether an RU scheduled in the trigger frame is a regular RU or the distributed RU in accordance with an embodiment.

FIG. 3 depicts an example format of a Common Information field 300, Special User Information field 340, and User Information field 360 of the trigger frame to signal whether an RU scheduled in the trigger frame is the distributed RU in accordance with an embodiment. With reference to FIG. 3, the Common Information field 300 is shown as including a Trigger Type field 302 that is bits B0 to B3 (4-bits), a UL Length field 304 that is bits B4 to B15 (12-bits), a More Trigger Frame (TF) field 306 that is bit B16 (1-bit), a CS Required field 308 that is bit B17 (1-bit), a UL Bandwidth (BW) field 310 that is bits B18 to B19 (2-bits), a Guard Interval (GI) and HE-LTF Type Transmission Opportunity (TXOP) Sharing Mode field 312 that is bits B20 to B21 (2-bits), a Reserved field 314 that is bit B22 (1-bit), a Number of HE-LTF Symbols and Midamble Periodicity field 316 that is bits B23 to B25 (3-bits), a Reserved field 318 that is bit B26 (1-bit), a Low-Density Parity Check (LDPC) Extra Symbol Segment field 320 that is bit B27 (1-bit), an AP Transmission (Tx) Power field 322 that is bits B28 to B33 (6-bits), a Pre-Forward Error Correction (FEC) Padding Factor field 324 that is bits B34 to B35 (2-bits), a Packet Extension (PE) Disambiguity field 326 that is bit B36 (1-bit), a UL Spatial Reuse field 328 that is bits B37 to B52 (16-bits), a Reserved field 330 that is bit B53 (1-bit), a HE/EHT P160 field 332 that is bit B54 (1-bit), a Special User Info Flag field 334 that is bit B55 (1-bit), an EHT Reserved field 336 that is bits B54 to B62 (9-bits), a Special User Info Flag field 338, a Reserved field 334 that is bit B63 (1-bit), and a Trigger Dependent Common Information field 340 that is a variable number of bits.

A bit (e.g., an RU type bit) included in the Common Information field 300 may be used to signal whether a requested RU is the regular RU or the distributed RU. For example, a 1 bit may indicate that the RU is a regular RU and a 0 bit may indicate that the RU is a distributed RU. In an embodiment, the RU type bit may be one bit in the Common Information field 300 to signal whether a requested RU is a regular RU where tones of the RU are contiguous or a distributed RU where tones of the RU are non-contiguous. In an embodiment, N bits added to the Common Information field 300 may indicate the RU type (e.g., regular RU or distributed RU) for a corresponding N frequency subblocks. For example, a "1" bit may indicate an RU type as distributed and a "0" but may indicate an RU type as regular (or vice-versa). In some embodiments, N bits may be a bitmap, such that each bit in the bitmap may indicate the RU type of a corresponding frequency subblock. In some embodiments, N bits may be signaled in bits included in the EHT Reserved field 336. As an example, when N=4-bits and a frequency subblock is 80 MHz, N bits may signal each frequency subblock's RU type in a 320 MHz signal bandwidth of four 80 MHz frequency subblocks arranged contiguously.

With reference to FIG. 3, the Special User Information field 340 is shown as including an AID 12 field 342 that is bits B0 to B11, a PHY Version ID field 344 that is bits B12 to B14, an UL Bandwidth extension field 346 that is bits B15 to B16, an EHT Spatial Reuse 1 Field 348 that is bits B17 to B20, an EHT Spatial Reuse 2 Field 350 that is bits B21 to B24, an U-SIG field 352 that is bits B25 to B36, a Reserved field 354 that is bits B37 to B39, and a Trigger Dependent User Information field 356. In an embodiment, the RU type bit may be one bit in the Special User Information field 300 to signal whether a requested RU is a regular RU where tones of the RU are contiguous or a distributed RU where tones of the RU are non-contiguously distributed. In some embodiments, N bits may be a bitmap, such that each bit in the bitmap may indicate the RU type of a corresponding frequency subblock. In some embodiments, N bits may be signaled in bits included in the U-SIG field 352 that is bits B25 to B36 or the Reserved field 354. As an example, when N=4-bits and a frequency subblock is 80 MHz, each bit may signal each of four frequency subblock's RU type which span a 320 MHz signal bandwidth. If the a Trigger Type field 302 of the Common Information field 300 indicates a basic trigger type, then N bits of the Trigger Dependent User Information field 356 such as B1:B4 may signal the RU type.

With reference to FIG. 3, the User Information field 360 is shown as including an AID12 field 362 that is bits B0 to B11 (12-bits), an RU Allocation field 364 that is bits B12 to B19 (8-bits), an Uplink Forward Error Correction (ULFEC) Coding Type field 366 that is bit B20 (1-bit), a UL High-Efficiency (HE) Modulation and Coding Scheme (MCS) field 368 that is bits B21 to B24 (4-bits), a Reserved field 370 that is bit B25 (1-bit), a Spatial Stream (SS) Allocation/Resource Allocation (RA)-RU Information field 372 that is bits B26 to B31 (6-bits), a UL Target Receive Power field 374 that is bits B32 to B38 (7-bits), a PS160 field 376 that is bit B39 (1-bit) and a Trigger Dependent User Information field 378. In an embodiment, the RU type bit may be one bit in the User Information field 300 for an RU to signal whether a requested RU is a regular RU where tones of the RU are contiguous or a distributed RU where tones of the RU are non-contiguously distributed. In one embodiment, the RU type bit may be bit B25 of the Reserved field 370. In another embodiment, the RU type bit may be a bit of the Trigger Dependent User Information field 378 if the Trigger Type field 302 of the Common Information field 300 indicates a basic trigger type. As an example, setting bit B5 of the Trigger Dependent User Information field 378 may signal that the requested RU is the distributed RU.

In an example, the distributed RU may be less than or equal to 484 tones. B5 may not be reserved so long as the RU size <996 tones. Further, if the bits of the PS160 field 376 and the RU Allocation field 364 indicate that the RU has 484 tones or less, then the non-AP STA which receives the trigger frame 154 may determine whether the RU to be transmitted in response to the trigger frame in a PPDU is a distributed or regular RU based on the RU type field 156.

In some examples, a frequency subblock in a channel may be used by another wireless device which is a legacy device to the MLD creating interference in the frequency subblock. This frequency subblock is referred to as a subchannel which is punctured. For example, one or more subchannels may be punctured in a channel. In presence of puncturing, the tones of an RU may be spread over a one frequency subblock or two frequency subblocks which are contiguous in the channel which are not punctured subchannels to form the distributed RU. For example, one or more 20 MHz subchannels may be punctured and tones of the RU may be spread in a 20 MHz frequency subblock, a 40 MHz frequency subblock, or an 80 MHz frequency subblock depending on a presence and amount of puncturing. If the RU scheduled is the distributed RU, the distributed RU spreading information signaling circuit 152 may further indicate in the trigger frame 154 one or more of one or more subchannels which are punctured and as a result a frequency subblock over which tones of the RU are spread so that the wireless device may form the distributed RU.

Figure 4:
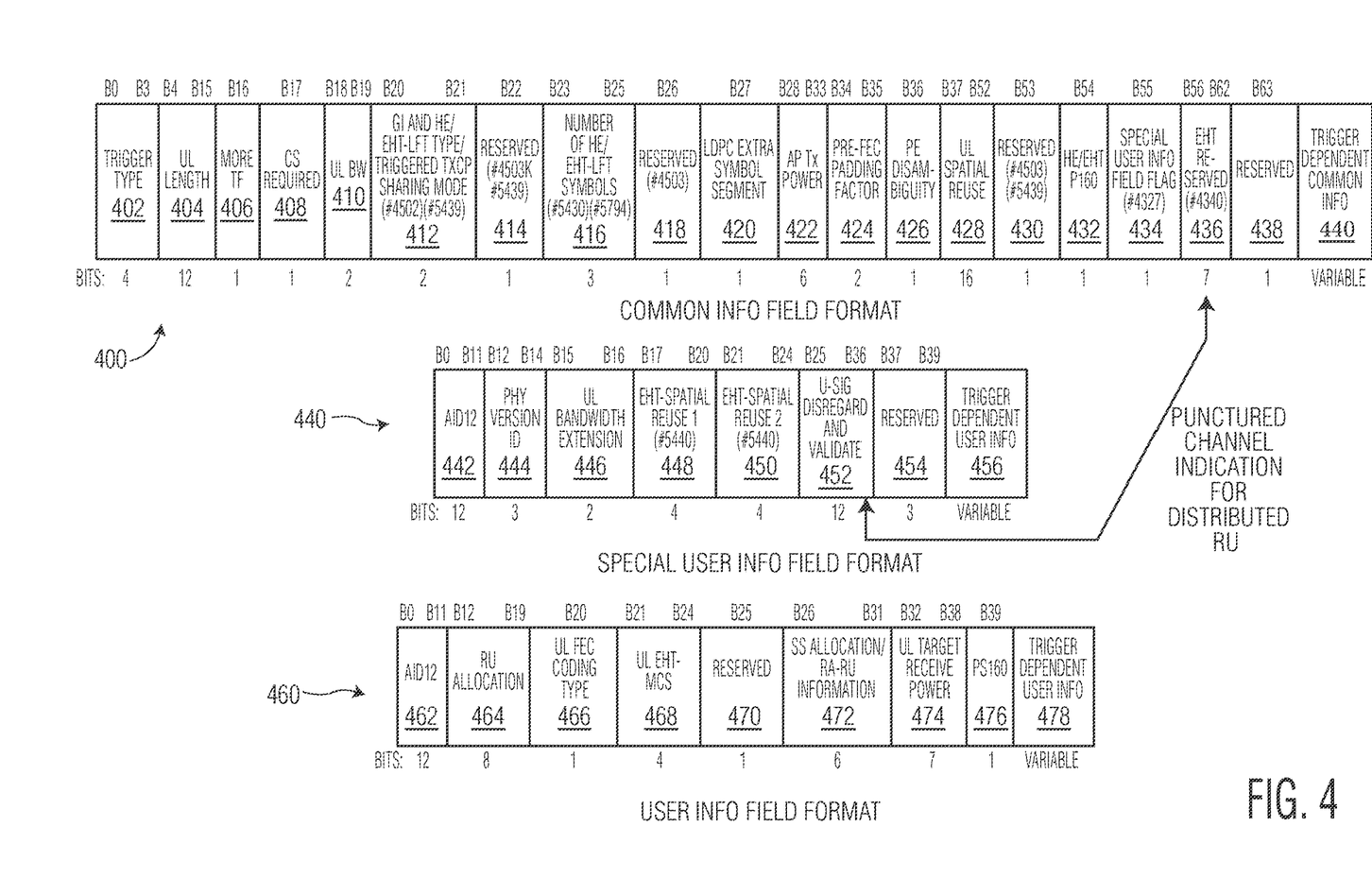
FIG. 4 depicts an example format of a Common Information field, Special User Information field, and User Information field of the trigger frame to signal whether a subchannels of a channel associated with a trigger based transmission is punctured in accordance with an embodiment.

FIG. 4 depicts an example format of a Common Information field 400, Special User Information field 440, and User Information field 460 of the trigger frame to signal whether a subchannel of a channel associated with a trigger based transmission is punctured in accordance with an embodiment. In one example, the trigger frame may indicate puncturing information of subchannels in a channel. A bitmap may indicate for each 20 MHz subchannel whether a subchannel is punctured. For example, in the bitmap, each bit may indicate whether a 20 MHz subchannel is punctured such that 16 bits indicates whether each of 16 subchannels of a 320 MHz signal bandwidth is punctured. Alternatively, the bitmap may be a 12 bit bitmap where 3 bits are used to indicate puncturing of the four 20 MHz subchannels in a 80 MHz frequency subblock and the total of 12 bits to indicate puncturing for the 320 MHz signal bandwidth.

If the bitmap is 16 bits, then the bits in the Special User Information field 440 may be used to indicate the puncturing. The Special User Information field 440 may be set with an AID of less than 2006 in the AID 12 field 442 and the bits in the Special User Information field 440 may be used to indicate the puncturing. If the bitmap is 12 bits, then the bits in Common Information field 400 or Special User Information field 440 can be repurposed/redefined to indicate the puncturing. For instance, 6-bits out of B56:B62 of the EHT Reserved field 436 in Common Information field may signal the puncturing in a primary 160 MHz (e.g. B56:B61), and 6-bits (B25:B30) of the U-SIG field 452 in the Special User Information field may signal the puncturing in a secondary 160 MHz. In some embodiments, either of the examples may set a bit to "0" or "1" to signal that the subchannel is punctured in the fields of the trigger frame 154.

The trigger frame may indicate an RU size and location of the RU. For example, the RU Allocation field 464 that is bits B12 to B19 in the User Information 460 field with the PS160 field 476 may define a 9 bit field which indicates an RU size and location of the RU in a frequency subblock by an index value into a table which indicates the RU size and location. The PS160 field 476 and bit zero (B0) of the RU Allocation field 464 may indicate the frequency subblock where the RU is located such as whether the RU is in a first 80 MHz frequency subblock, second 80 MHz frequency subblock, etc. of a sequence of four contiguous 80 MHz frequency subblocks which equals a 320 MHz signal bandwidth. Further, the bits of the RU Allocation field 464 may indicate as an RU index one or more 20 MHz frequency subblocks in the 80 MHz frequency subblock where the tones of the RU is located if the RU was an regular RU. The RU size may be a number of tones in the RU.

If none of the subchannels in an 80 MHz frequency subblock is punctured, then the non-AP STA which receives the trigger frame spreads tones of the RU over the 80 MHz frequency subblock in which the RU is located and transmits a PPDU with the distributed RU to the AP. If one or more of the subchannels are punctured in the 80 MHz frequency subblock, then the tones of the RU may be spread over one or more subchannels which are not punctured based on an indication of puncturing in the trigger frame. In an example, the spreading may be over a 20 MHz frequency subblock or a contiguous 40 MHz frequency subblock of the 80 MHz frequency subblock. For example, the spreading may be within a 40 MHz frequency subblocks where the RU is located within an 80 MHz frequency subblock. Further, the spreading may be limited to 20 MHz within a 40 MHz frequency subblock if there is a puncture in the subchannel of the 40 MHz frequency subblock. Alternatively, the spreading may be 40 MHz frequency subblock if there is no puncture in the subchannel of the 40 MHz frequency subblock. In an example, the 40 MHz frequency subblock may be the first two 20 MHz frequency subblocks (i.e., 0 to 40 MHz) or second two 20 MHz frequency subblocks (i.e., 40 to 80 MHz) in an 80 MHz frequency subblock.

In some examples, the distributed RU spreading information signaling circuit 152 may directly indicate in the trigger frame 154 the spreading of the tones of the distributed RU in a bandwidth if the RU scheduled is the distributed RU. The non-AP STA which receives the trigger frame 154 may not have to determine the spreading based on the bitmap indicating puncturing of the subchannels in the channel to form the distributed RU.

Figure 5:
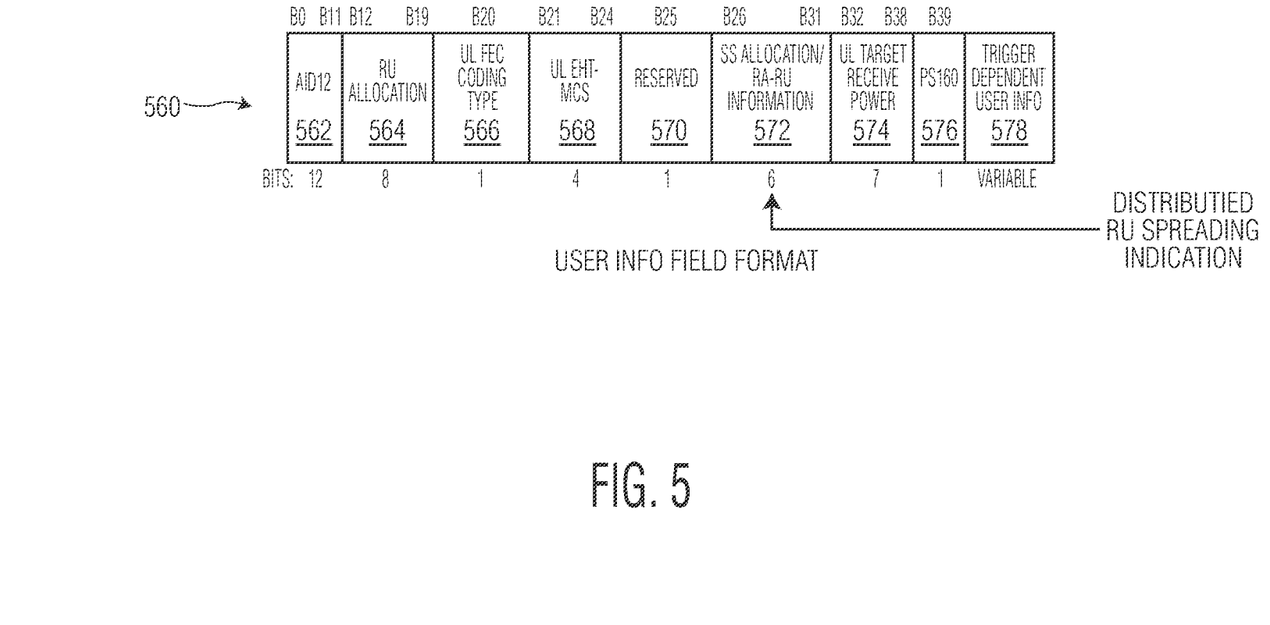
FIG. 5 depicts an example format of the User Information field of the trigger frame to signal the spreading of tones of the distributed RU in accordance with an embodiment.

FIG. 5 depicts an example format of a User Information field 560 of the trigger frame to signal the spreading of tones of the distributed RU in accordance with an embodiment. The RU Allocation field 564 that is bits B12 to B19 in the User Information 560 field and the PS160 field 576 may indicate the RU size and location of the RU. The RU size may be a number of tones in the RU and the location may be one or more frequency subblocks where tones of the RU are located. Depending on the location of the RU, a two bit value may indicate a bandwidth of spreading of the tones of the RU by the distributed tone mapper 204. In an example, an 80 MHz frequency subblock may comprise four 20 MHz frequency subblocks, where two lower contiguous 20 MHz frequency subblocks is a lower 40 MHz frequency subblock and a two upper contiguous 20 MHz frequency subblocks is an upper 40 MHz frequency subblock.

In an example, the value indicates the spreading bandwidth in both 40 MHz frequency subblocks based on puncturing, e.g., "00" may indicate no puncturing and 80 MHz spreading in the 80 MHz frequency subblock, "01" may indicate 20 MHz spreading when the RU is located in a lower 40 MHz frequency subblock with 20 MHz subchannel puncturing and 40 MHz spreading when the RU is located in an upper 40 MHz frequency subblock with no subchannel puncturing, "10" may indicate 40 MHz spreading when the RU is located in a lower 40 MHz frequency subblock with no subchannel puncturing and 20 MHz spreading when the RU is located in an upper 40 MHz frequency subblock with 20 MHz subchannel puncturing, and "11" may indicate 20 MHz spreading when the RU is located in a lower 40 MHz frequency subblock with 20 MHz subchannel puncturing and 20 MHz spreading in an upper 40 MHz frequency subblock when the RU is located in an upper 40 MHz frequency subblock with 20 MHz subchannel puncturing. The value is determined by the AP based on the subchannel puncturing in the channel and provided to the non-AP STA so that the non-AP STA spreads the RU in one or more 20 MHz frequency subblocks of an 80 MHz frequency subblock based on the 20 MHz frequency subblock(s) where the RU is located in the 80 MHz frequency subblock and the spreading indicated by the value.

In another example, the value only indicates the spreading bandwidth of the allocated RU, e.g., "00" may indicate no puncturing and 80 MHz spreading, "01" may be reserved, "10" may indicate 20 MHz spreading, "11" may indicate 40 MHz spreading. The value other than "00" and "01" is determined by the AP based on the location of the RU and where the subchannel puncturing is located. For example, if the RU is located in an upper or lower 40 MHz frequency subblock with no puncturing, then the RU is spread over 40 MHz while if the RU is located in an upper or lower 40 MHz frequency subblock with puncturing, then the RU is spread over 20 MHz in the 40 MHz frequency subblock. The value is provided to the non-AP STA so that the non-AP STA spreads the RU in one or more 20 MHz frequency subblocks of an 80 MHz frequency subblock based on the 40 MHz frequency subblock(s) where the RU is located in the 80 MHz frequency subblock and the spreading indicated by the value.

In some examples, two bits of the 6 bits SS Allocation field 572 such as B27:B28 may be used to indicate the spreading in the trigger frame. For example, only 1 or 2 bits of the number of spatial streams (SS) in the SS Allocation field 572 may be needed to indicate a number of spatial streams because the distributed RU is allocated to a single wireless device with a maximum of two spatial streams to the wireless device and a four bit starting spatial stream index is not used and can be repurposed. In an example, if the RU type is a dRU, then the additional bits of the SS Allocation field may be used to indicate the spreading.

The User Information field may have limited bits to indicate the bandwidth over which the tones of the distributed RU is spread. As an alternative, the bandwidth over which the tones are spread may be indicated in the Common Information field or Special User Information field to reduce a number of bits that are used in the User Information field to indicate the signaling.

Figure 6:
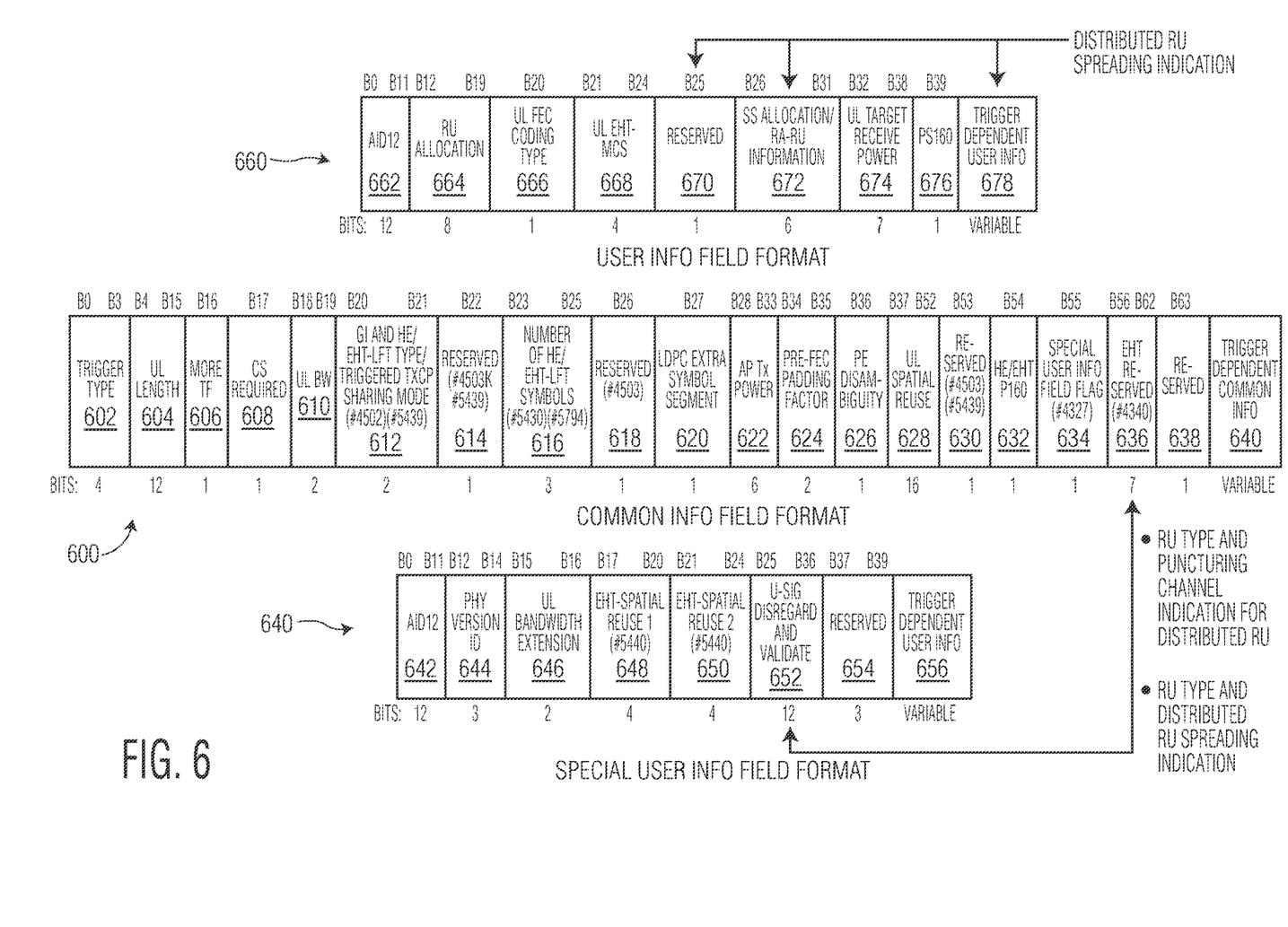
FIG. 6 depicts an example format of the Common Information field, User Information field, and Special User Information field of the trigger frame to signal the spreading of the tones of the distributed RU in in accordance with an embodiment.

FIG. 6 depicts an example format of the Common Information field 600, Special User Information field 640, and User Information field 660 of the trigger frame to signal the spreading of the tones of the distributed RU in accordance with an embodiment. The trigger frame may indicate an RU size and location of the RU. For example, the RU Allocation field 664 that is bits B12 to B19 in the User Information 660 field and the PS160 field 676 may define a 9 bit field to indicate an RU size and location of the RU in a frequency subblock. The RU size may be a number of tones in the RU and the location may be the frequency subblock where the tones of the RU are located if the RU was a regular RU. The trigger frame further indicates how the tones of the RU is spread to form a dRU. For example, in one or more of the Common Information field 600 and the Special User Information field 640 one bit may be used to indicate an RU type and one bit may indicate whether there is puncturing in a subchannel of a frequency subblock. In an example, eight bits may be used to indicate the RU type and puncturing for four 80 MHz frequency subblocks collectively spanning a 320 MHz bandwidth with 4 bits indicated by B56:B62 of the EHT Reserved field 636 in the Common Information field 600 and 4 bits indicated by B32:B35 or B25:B30 of the U-SIG field 652 of the Special User Information field 640. Further, in the User Information field 660, one bit in the Reserved field 670, the SS Allocation field 672, or Trigger Dependent User Info field 678 may indicate whether the tones of the distributed RU is spread over 20 MHz or 40 MHz frequency subblocks for the location of the RU and if there is no puncturing then the bit is reserved and spread over a 80 MHz frequency subblock by default. In another example, 3 bits may be used in the Common Information field 600 or Special User Information field 640 where 1 bit may indicate an RU type and two bits as described above may indicate a bandwidth over which the tones of the distributed RU is spread.

In another example, a location and spreading of tones of a distributed RU may be directly indicated by the distributed RU spreading information signaling circuit 152 in the trigger frame. The User Information field may be used to indicate this location and spreading directly instead of the non-AP STA having to determining the location of an RU based on the RU Allocation field and P160 field and then spreading as described above.

Figure 7:
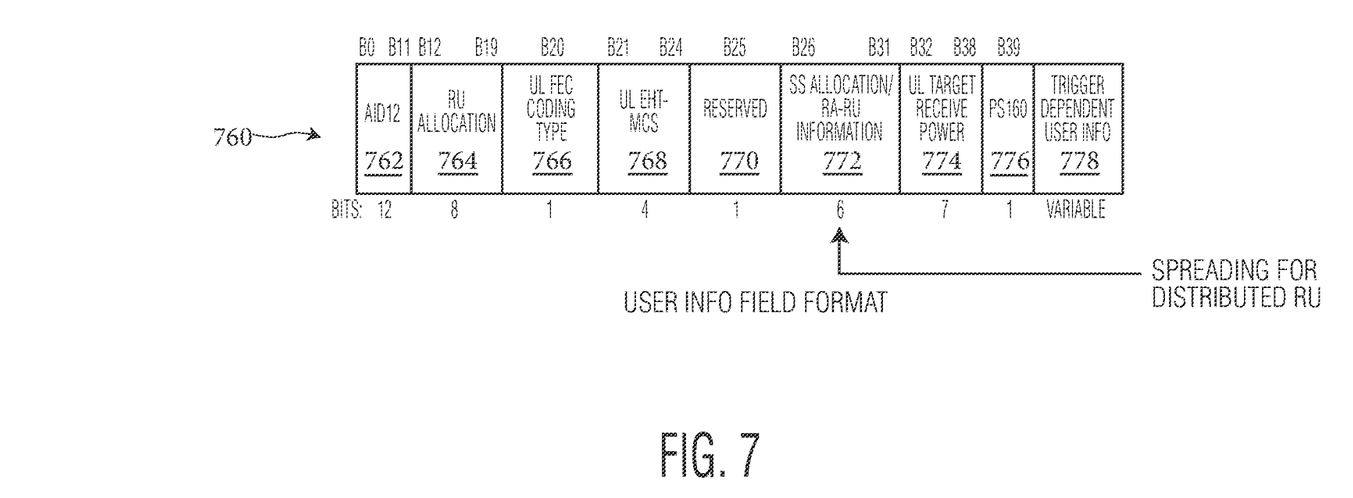
FIG. 7 depicts an example format of a User Information field of the trigger frame to signal the spreading of the tones of the distributed RU in accordance with an embodiment.

FIG. 7 depicts an example format of a User Information field 760 of the trigger frame to signal the spreading of the tones of the distributed RU in accordance with an embodiment. The AP STA may determine the spreading by the subchannel puncturing and location of the RU in an 80 MHz frequency block as described above and signal the spreading in the trigger frame 154. The indication of spreading may be indicated for a frequency subblock. If the frequency subblock has a 80 MHz bandwidth in an example, the indication may be three bits where "000": 80 MHz spreading; "001" reserved; "010": spreading in a lower 40 MHz frequency subblock of the 80 MHz frequency subblock; "011": spreading in an upper 40 MHz frequency subblock of the 80 MHz frequency subblock; and "100"-"111": spreading in a 20 MHz frequency subblock of the 80 MHz frequency subblock, from lowest 20 MHz to highest 20 MHz frequency subblock where each 3 bit value corresponds to spreading in a particular 20 MHz frequency subblock within a frequency subblock of 80 MHz. In another example, three bits may be used to indicate an RU type and spreading of the tones of the RU in the frequency subblock, including spreading in a lower 40 MHz frequency subblock of the 80 MHz frequency block; spreading in an upper 40 MHz frequency subblock of the 80 MHz frequency subblock, and spreading in one of the four 20 MHz frequency subblock of the 80 MHz frequency subblock. As an example, "000": rRU within 80 MHz frequency subblock; "001": dRU spreading within 80 MHz frequency subblock; 010: dRU spreading within the lower 40 MHz frequency subblock; "011": dRU spreading within the upper 40 MHz frequency subblock; "100"-"111": dRU spreading within one of the 20 MHz frequency subblock, from lowest 20 to highest 20 MHz frequency subblock of 80 MHz frequency subblock where each 3 bit value corresponds to spreading in a particular 20 MHz frequency subblock. The three bits may be indicated in the 6-bit SS Allocation subfield 772 in an example.

Example Methods

Figure 8:
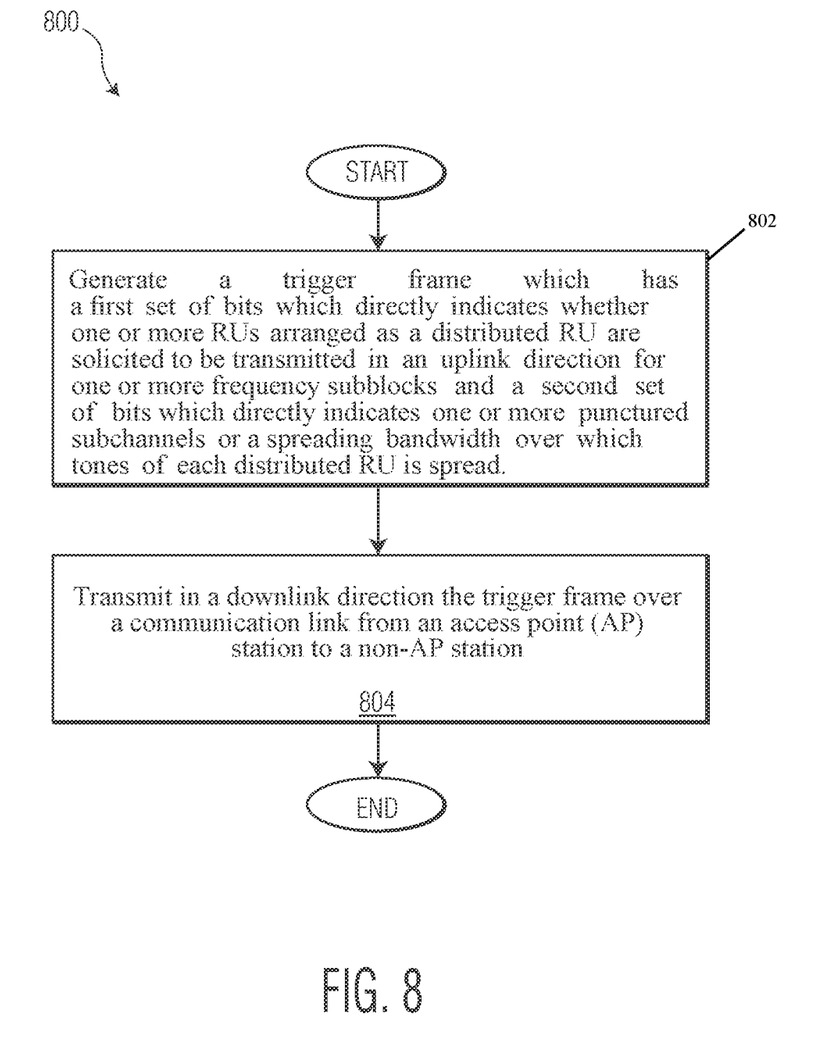
FIG. 8 illustrates a flow diagram of functions for wireless communications in accordance with an embodiment of the invention.

FIG. 8 illustrates a flow diagram 800 of functions for wireless communications in accordance with an embodiment of the invention. In examples, the functions may be performed by the distributed RU type signaling circuit 150 and distributed RU spreading information signaling circuit 152 of the AP MLD 104 to trigger a non-AP STA of the non-AP MLD 108 to transmit a distributed RU.

The flow diagram may include blocks 802 and 804. At block 802, a trigger frame 154 is generated which has a first set of bits which directly indicates whether one or more resource units (RU) arranged as a distributed RU are solicited to be transmitted in an uplink direction for one or more frequency subblocks and a second set of bits which directly indicates whether one or more subchannels are punctured or a spreading bandwidth over which tones of each distributed RU is spread. The first set of bits may include a bit in the trigger frame which indicates whether an RU in an 80 MHz frequency subblock is the distributed RU. The second set of bits may indicate one or more of whether the RU may be spread with 40 MHz spreading or 20 MHz spreading, a puncturing of subchannels, and which frequency block(s) tones of the RU is spread. At block 804, the trigger frame 154 is transmitted over a communication link in a downlink direction from an access point (AP) station to a non-AP station. The wireless device which receives the trigger frame 154 which may be the non-AP STA parses the fields of the trigger frame to determine the first set of bits and the second set of bits. The bits may be used by the wireless device to generate an uplink PPDU with data modulated on tones of the distributed RU which are spread in a frequency subblock indicated by the trigger frame 154 that is transmitted.

In an embodiment, a method for wireless communications is disclosed. The method comprises: generating a trigger frame which has a first set of bits which directly indicates one or more resource units (RU) arranged as a distributed RU are solicited to be transmitted in an uplink direction in one or more first frequency subblocks and a second set of bits which directly indicates for one or more second frequency subblocks a spreading bandwidth of tones of the distributed RU or whether a second frequency subblock is a punctured subchannel; an transmitting in a downlink direction the trigger frame over a communication link by an access point (AP) station to a non-AP station, wherein the non-AP station generates and transmits in the uplink direction a Physical Layer Protocol Data Unit (PPDU) to the AP station in response to the trigger frame, the PPDU having data modulated on the tones of the distributed RU based on the first set of bits and the second set of bits. In an example, the distributed RU is signaled by an RU type bit included in first set of bits of the trigger frame, the RU type bit which has a first value to signal the distributed RU and a second value to signal a regular RU. In an example, the first set of bits is an N bit field where each bit corresponds to a respective frequency subblock of the one or more first frequency subblocks and indicates whether the RU within the respective frequency subblock of the one or more first frequency subblocks is one of a regular RU with contiguous tones and the distributed RU with non-contiguous tones. In an example, the second set of bits indicates subchannel puncturing for each of the second one or more frequency subblocks. In an example, at least one bit of the second set of bits is in a Special User Information field of the trigger frame. In an example, at least one bit of the second set of bits is in a Common Information field and a Special User Information field of the trigger frame. In an example, the tones of the distributed RU are spread based on the subchannel puncturing. In an example, the method further comprises receiving the trigger frame by the non-AP station; generating by the non-AP station the PPDU with the distributed RU based on the first set of bits and the second set of bits; and transmitting the PPDU with the distributed RU by the non-AP station. In an example, the spreading bandwidth is based on where the RU is located in the one or more second frequency subblocks indicated by another set of bits in the trigger frame. In an example, the second set of bits only indicate the spreading bandwidth over which the tones of the distributed RU is spread. In an example, the second set of bits indicate both the spreading bandwidth and which of the one or more second frequency subblocks in a signal bandwidth the tones of the distributed RU are spread.

In another embodiment, an access point (AP) station is disclosed. The AP station comprises: a processor configured to: generate a trigger frame which has a first set of bits which directly indicates a resource unit (RU) arranged as a distributed RU is solicited to be transmitted in an uplink direction in a first frequency block and a second set of bits which directly indicates for one or more second frequency subblocks a spreading bandwidth of tones of the distributed RU or whether a second frequency subblock is a punctured subchannel; and transmit in a downlink direction the trigger frame over a communication link by the AP station to a non-AP station, wherein the non-AP station generates and transmits in the uplink direction a Physical Layer Protocol Data Unit (PPDU) to the AP station in response to the trigger frame, the PPDU having data modulated on the tones of the distributed RU based on the first set of bits and the second set of bits. In an example, the second set of bits indicates subchannel puncturing for each of the second one or more frequency subblocks. In an example, at least one bit of the second set of bits is in a Special User Information field of the trigger frame. In an example, at least one bit of the second set of bits is in a Common Information field and a Special User Information field of the trigger frame. In an example, the tones of the distributed RU are spread based on the subchannel puncturing. In an example, the second set of bits only indicate the spreading bandwidth over which the tones of the distributed RU is spread. In an example, the second set of bits indicate both the spreading bandwidth and which of the one or more second frequency subblocks in a signal bandwidth the tones of the distributed RU are spread. In an example, the second set of bits is in a User Information field of the trigger frame or a Spatial Stream Allocation subfield of the User Information field. In an example, the tones of the distributed RU is to be spread only over one of a 20 MHz second frequency subblock or 40 MHz second frequency subblock within a 80 MHz first frequency subblock.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for wireless communications, the method comprising:
   generating a trigger frame which has a first set of bits which directly indicates for each of one or more resource units (RU) solicited to be transmitted in an uplink direction in a respective frequency subblock of a plurality of first frequency subblocks whether a respective RU is to be arranged as a distributed RU and a second set of bits which directly indicates spreading bandwidths for each of the one or more RUs over which tones of the RU are spread within one or more second frequency subblocks, wherein a bandwidth of the distributed RU after spreading is greater than a bandwidth of the RU before spreading, wherein the first set of bits is an N bit field where each bit corresponds to a respective frequency subblock of the plurality of first frequency subblocks that collectively span a signal bandwidth and indicates whether the RU within the respective frequency subblock of the plurality of first frequency subblocks is one of a regular RU and the distributed RU; and
   transmitting in a downlink direction the trigger frame over a communication link by an access point (AP) station to a non-AP station, wherein the non-AP station generates and transmits in the uplink direction a Physical Layer Protocol Data Unit (PPDU) to the AP station in response to the trigger frame, the PPDU having data modulated on the tones of the distributed RU based on the first set of bits and the second set of bits.

2. The method of claim 1, wherein the first set of bits of the trigger frame is RU type bits, the RU type bit which has a first value to signal the distributed RU and a second value to signal the regular RU.

3. The method of claim 1, the second set of bits indicates subchannel puncturing for each of the one or more second frequency subblocks.

4. The method of claim 3, wherein at least one bit of the first set of bits is in a Special User Information field of the trigger frame.

5. The method of claim 3, wherein at least one bit of the second set of bits is in a Common Information field or a Special User Information field of the trigger frame.

6. The method of claim 3, wherein the tones of the distributed RU are spread based on the subchannel puncturing.

7. The method of claim 1, further comprising receiving the trigger frame by the non-AP station; generating by the non-AP station the PPDU with the distributed RU based on the first set of bits and the second set of bits; and transmitting the PPDU with the distributed RU by the non-AP station.

8. The method of claim 1, wherein the spreading bandwidth is based on where the RU is located in the one or more second frequency subblocks.

9. The method of claim 1, wherein the second set of bits only indicate the spreading bandwidth over which the tones of the distributed RU is spread.

10. The method of claim 1, wherein the second set of bits indicate both the spreading bandwidth and which portion of the one or more second frequency subblocks the tones of the distributed RU are spread.

11. An access point (AP) station comprising:
a processor configured to:
generate a trigger frame which has a first set of bits which directly indicates for each of one or more resource units (RUs) solicited to be transmitted in an uplink direction in a respective frequency subblock of a plurality of first frequency subblocks whether the respective RU is to be arranged as a distributed RU and a second set of bits which directly indicates spreading bandwidths for each of the one or more RUs over which tones of the RU are spread within one or more second frequency subblocks, wherein a bandwidth of the distributed RU is greater than a bandwidth of the RU before spreading, wherein the first set of bits is an N bit field where each bit corresponds to a respective frequency subblock of the plurality of first frequency subblocks that collectively span a signal bandwidth and indicates whether the RU within the respective frequency subblock of the plurality of first frequency subblocks is one of a regular RU and the distributed RU; and
transmit in a downlink direction the trigger frame over a communication link by the AP station to a non-AP station, wherein the non-AP station generates and transmits in the uplink direction a Physical Layer Protocol Data Unit (PPDU) to the AP station in response to the trigger frame, the PPDU having data modulated on the tones of the distributed RU based on the first set of bits and the second set of bits.

12. The AP station of claim 11, wherein the second set of bits indicates subchannel puncturing for each of the one or more second frequency subblocks.

13. The AP station of claim 12, wherein at least one bit of the first set of bits is in a Special User Information field of the trigger frame.

14. The AP station of claim 12, wherein at least one bit of the second set of bits is in a Common Information field or a Special User Information field of the trigger frame.

15. The AP station of claim 12, wherein the tones of the distributed RU are spread based on the subchannel puncturing.

16. The AP station of claim 11, wherein the second set of bits only indicate the spreading bandwidth over which the tones of the distributed RU is spread.

17. The AP station of claim 11, wherein the second set of bits indicate both the spreading bandwidth and which portion of one or more second frequency subblocks the tones of the distributed RU are spread.

18. The AP station of claim 11, wherein the second set of bits is in a User Information field of the trigger frame.

19. The AP station of claim 11, wherein the tones of the distributed RU is to be spread only over one of a 20 MHz second frequency subblock or 40 MHz second frequency subblock within a 80 MHz first frequency subblock.

* * * * *